(12) United States Patent
Niu et al.

(10) Patent No.: US 12,015,136 B2
(45) Date of Patent: Jun. 18, 2024

(54) BATTERY PACK

(71) Applicants: CALB Co., Ltd., Jiangsu (CN); CALB Technology Co., Ltd., Jiangsu (CN)

(72) Inventors: Li Niu, Luoyang (CN); Xinjian Li, Changzhou (CN); Xuan Zhang, Changzhou (CN); Guohua Sun, Luoyang (CN); Zhouli Li, Luoyang (CN); Qixin Guo, Luoyang (CN)

(73) Assignees: CALB Co., Ltd., Jiangsu (CN); CALB Technology Co., Ltd., Jiangsu (CN)

( * ) Notice: Subject to any disclaimer, the term of this patent is extended or adjusted under 35 U.S.C. 154(b) by 0 days.

(21) Appl. No.: 17/341,389

(22) Filed: Jun. 8, 2021

(65) Prior Publication Data
US 2022/0336890 A1    Oct. 20, 2022

(30) Foreign Application Priority Data

Apr. 14, 2021    (CN) .......................... 202110400630.8

(51) Int. Cl.
*H01M 10/6567* (2014.01)
*H01M 10/613* (2014.01)
(Continued)

(52) U.S. Cl.
CPC ..... *H01M 10/6567* (2015.04); *H01M 10/613* (2015.04); *H01M 10/6552* (2015.04);
(Continued)

(58) Field of Classification Search
None
See application file for complete search history.

(56) References Cited

U.S. PATENT DOCUMENTS

| | | | |
|---|---|---|---|
| 2006/0132101 A1* | 6/2006 | Ambrosio | H01M 10/613 |
| | | | 320/150 |
| 2008/0233475 A1* | 9/2008 | Kozu | H01M 10/6566 |
| | | | 429/159 |

(Continued)

FOREIGN PATENT DOCUMENTS

| | | |
|---|---|---|
| CN | 206379394 | 8/2017 |
| CN | 107181020 | 9/2017 |

(Continued)

OTHER PUBLICATIONS

"Office Action of China Counterpart Application", issued on Dec. 28, 2021, with partial English translation thereof, p. 1-p. 16.

(Continued)

*Primary Examiner* — Ula C Ruddock
*Assistant Examiner* — Mary Grace Byram
(74) *Attorney, Agent, or Firm* — JCIP GLOBAL INC.

(57) ABSTRACT

A battery pack includes a battery column and a liquid cooling tube. The battery column includes at least two batteries, and the batteries are arranged in a first direction. The liquid cooling tube is disposed on a surface of the battery column and is configured to dissipate heat for the batteries. The liquid cooling tube includes cooling portions, and the cooling portions are portions having orthographic projections on the battery column. The orthographic projections of the cooling portions on the battery column are cooling regions. The cooling portions extend in a second direction, and the second direction is not parallel to the first direction.

8 Claims, 6 Drawing Sheets

(51) Int. Cl.
*H01M 10/6552* (2014.01)
*H01M 10/6556* (2014.01)
*H01M 10/6568* (2014.01)
*H01M 10/658* (2014.01)
*H01M 50/204* (2021.01)
*H01M 50/524* (2021.01)

(52) U.S. Cl.
CPC ... *H01M 10/6556* (2015.04); *H01M 10/6568* (2015.04); *H01M 10/658* (2015.04); *H01M 50/204* (2021.01); *Y02E 60/10* (2013.01)

(56) References Cited

U.S. PATENT DOCUMENTS

| | | | | |
|---|---|---|---|---|
| 2008/0299452 | A1* | 12/2008 | Nakazawa | H01M 10/6555 429/152 |
| 2010/0028758 | A1 | 2/2010 | Eaves et al. | |
| 2016/0149276 | A1* | 5/2016 | Elliot | H01M 10/625 429/72 |
| 2019/0148681 | A1* | 5/2019 | Park | H01M 50/289 429/120 |

FOREIGN PATENT DOCUMENTS

| | | |
|---|---|---|
| CN | 207441916 | 6/2018 |
| CN | 109244309 | 1/2019 |
| CN | 209843769 | 12/2019 |
| CN | 111129385 | 5/2020 |
| CN | 112054141 | 12/2020 |
| CN | 112072203 | 12/2020 |
| CN | 112382805 | 2/2021 |
| CN | 110120564 | 4/2021 |
| DE | 102008059954 | 6/2010 |
| EP | 3751661 | 12/2020 |

OTHER PUBLICATIONS

"Search Report of Europe Counterpart Application", issued on Dec. 6, 2021, p. 1-p. 8.

Office Action of China Counterpart Application, with English translation thereof, issued on Sep. 5, 2022, pp. 1-14.

* cited by examiner

BATTERY PACK

CROSS-REFERENCE TO RELATED APPLICATION

This application claims the priority of China patent application serial no. 202110400630.8, filed on Apr. 14, 2021. The entirety of the above-mentioned patent application is hereby incorporated by reference herein and made a part of this specification.

BACKGROUND

Technical Field

The disclosure relates a battery technology field, and in particular, relates to a battery pack.

Description of Related Art

Generally, the heat conduction management design of an existing battery pack product is provided based on the harmonica tube cooling plate, which has a flowing direction parallel to the length of the module and the whole pack. From the perspective of conventional heat conduction management and temperature control, the harmonica tube design ensures a larger solid-liquid heat exchange area, so that it is easy to achieve a favorable heat dissipation effect.

Nevertheless, when thermal runaway occurs in a battery in the battery pack, the heat generated by the thermal runaway is transferred to adjacent batteries in the same module in large amounts through large surface of the battery and side plates of the module, and this causes a risk of thermal diffusion. The runner designed to have a flowing direction parallel to the length direction of the module may expand the path to transfer heat to adjacent batteries of the battery in thermal runaway, and the risk of thermal diffusion may thus rise.

Further, harmonica tubes still have the common defect of pipe flow. That is, when a working fluid flows in a pipe, the temperature continues to rise and the heat exchange potential is reduced, and this causes the heat dissipation of liquid cooling at downstream of the pipe is lower than that of the upstream, and the temperature difference among the batteries in the module/battery pack increases.

SUMMARY

The disclosure provides a battery pack.

According to one aspect of the disclosure, a battery pack is provided, and the battery pack includes a battery column and a liquid cooling tube. The battery column includes at least two batteries, and the batteries are arranged in a first direction. The liquid cooling tube is disposed on a surface of the battery column and is configured to dissipate heat for the batteries. The liquid cooling tube includes cooling portions, and the cooling portions are portions having orthographic projections on the battery column. The orthographic projections of the cooling portions on the battery column are cooling regions, the cooling portions extend in a second direction, and the second direction is not parallel to the first direction.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium".

For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Embodiment One

Figure 1:
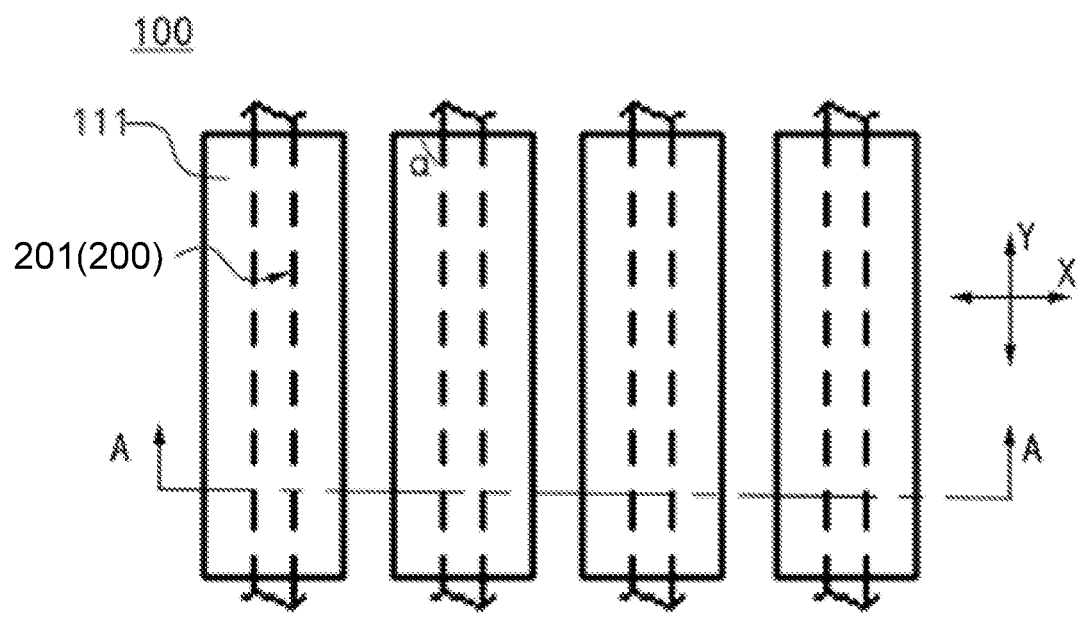
FIG. 1 is a schematic top view illustrating a partial structure of a battery pack according to an exemplary embodiment of the disclosure.

With reference to FIG. 1, which is a schematic top view illustrating a portion of a structure of a battery pack according to an embodiment of the disclosure. In this exemplary embodiment, a battery pack applied to an electric car is treated as an example of the battery pack provided by the disclosure. A person having ordinary skill in the art should easily understand that, in order to apply the relevant design of the disclosure to other types of battery packs, various modifications, additions, substitutions, deletions, or other changes may be made to the following specific embodiments, and these changes still fall within the scope of the principle of the battery pack provided by the disclosure.

Figure 2:
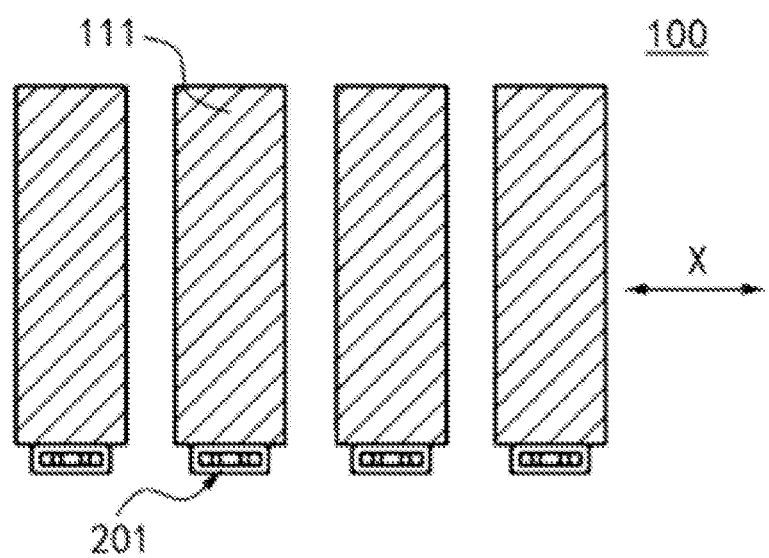
FIG. 2 is a cross-sectional view taken along line A-A in FIG. 1.

As shown in FIG. 1, in this embodiment, the battery pack provided by the disclosure includes a battery column 100 and a liquid cooling tube 200, and the battery column 100 includes at least two batteries 111. With reference to FIG. 2, FIG. 2 is a schematic cross-sectional view taken along line A-A in FIG. 1. Hereinafter, a structure, a connection manner, and a functional relationship of main components of the battery pack provided by the disclosure are described in detail with reference to the above-mentioned figures.

As shown in FIG. 1, in this embodiment, the batteries 111 are arranged in a first direction X. The liquid cooling tube 200 is disposed on a surface of the battery, for example, a top surface, a bottom surface, or at least one of two side surfaces or two end surfaces column 100. In this embodiment, the liquid cooling tube 200 is provided on the bottom surface of the battery column 100 as an example for description. Herein, the liquid cooling tube 200 includes cooling portions 201, and the cooling portions 201 are portions having orthographic projections on the battery column 100. The orthographic projections of the cooling portions 201 on the battery column 100 are cooling regions. Based on the above, the cooling portions 201 extend in a second direction Y, and the second direction Y is not parallel to the first direction X, that is, an included angle α is provided therebetween. Compare to an existing battery pack, in the disclosure, the liquid cooling tube 200 adopts the design that an extending direction of the cooling portions 201 is not parallel to an arrangement direction of the batteries 111, and in this way, part of heat may thus be easily taken away by cooling liquid in the liquid cooling tube 200, heat transferred to other batteries 111 in the same module is decreased, so as to inhibit occurrence of thermal runaway.

Optionally, as shown in FIG. 1, in this embodiment, the first direction X may be perpendicular to the second direction Y, that is, the included angle α may be equal to 90°. Accordingly, when the included angle α is 90°, the liquid cooling tube may inhibit heat generated by thermal runaway from being transferred to other batteries 111 in the same battery module to a maximum extent, and may bring the heat to other battery modules. In this way, thermal runaway is inhibited from occurring in the entire battery module where the batteries 111 in which thermal runaway occurs is located.

Optionally, in this embodiment, a length of each of the cooling portions 201 in the second direction Y is equal to a width of each of the batteries 111 in the second direction Y. That is, a length of the liquid cooling tube 200 in the second direction Y is greater than or equal to the width of each of the batteries 111 in the second direction Y. In this way, heat may be easily taken out of the batteries 111 by the cooling liquid in the liquid cooling tube 200 and thus may be transferred to other battery modules, and occurrence of thermal runaway may be effectively inhibited in the same battery module.

Embodiment Two

Figure 3:
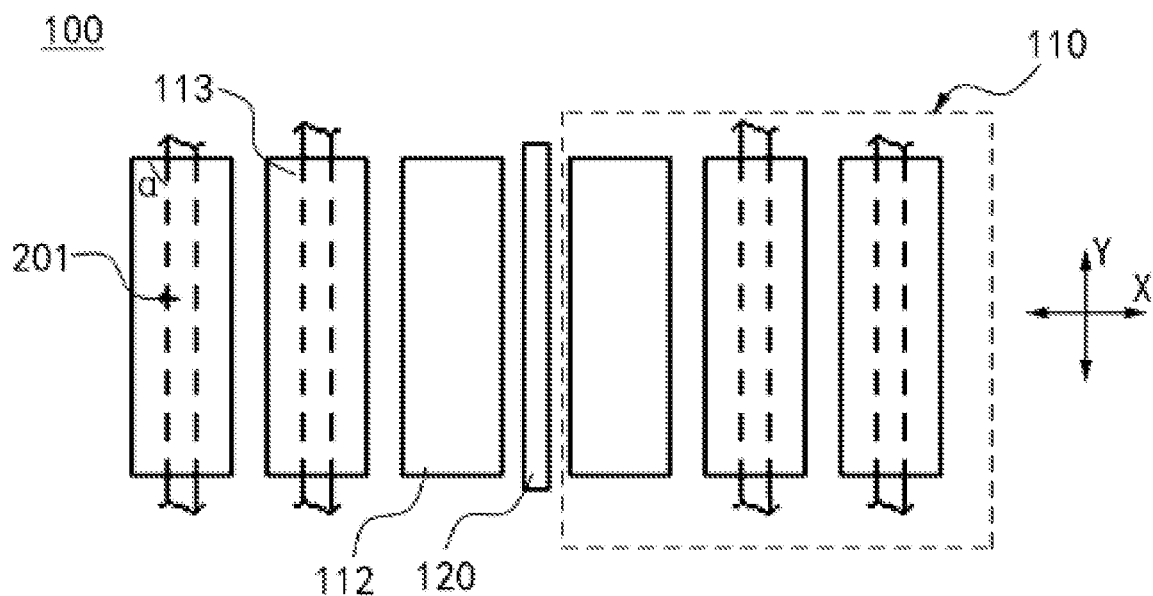
FIG. 3 is a schematic top view illustrating a partial structure of a battery pack according to another exemplary embodiment of the disclosure.

Based on the detailed description of the battery pack of embodiment one provided by the disclosure, description of the battery pack of embodiment two provided by the disclosure is stated as follows with reference to FIG. 3. As shown in FIG. 3, which is a schematic top view illustrating a partial structure of the battery pack according to embodiment two of the disclosure. The battery pack provided in embodiment two adopts a design substantially similar to that adopted in embodiment one, and a difference in battery pack design between embodiment two and embodiment one is described as follows.

As shown in FIG. 3, in this embodiment, in one battery column 100, at least one of the batteries 111 is located outside a range of the cooling portions 201. For instance, the battery column 100 shown in FIG. 3 includes six batteries 111, and two of the batteries 111 are located outside the range of the cooling regions 201. Compare to an existing battery pack, the disclosure adopts the design in which at least one of the batteries 111 is located outside the range of the cooling portions 201, and in this way, part of heat may be easily taken away by the cooling liquid in the liquid cooling tube 200, so that heat transferred to other batteries 111 in the same battery module is decreased, and occurrence of thermal runaway may be easily inhibited in the entire battery module.

Optionally, as shown in FIG. 3, in this embodiment, the battery pack provided by the disclosure includes at least two battery units 110, and each of the battery units 110 includes at least one battery 111. A heat insulation structure 120 is provided between adjacent battery units 110, and the heat insulation structure 120 may include, but not limited to, a heat insulation pad. Based on the above, the cooling regions may be located in a range of the battery units 110. In other words, the heat insulation structure 120 does not overlap with the cooling regions of the cooling portions 201 at all. Accordingly, when thermal runaway occurs in a battery 111, part of heat is blocked in the battery unit 110 where the battery 111 is located through the heat insulation structure 120. Since the cooling regions of the cooling portions 201 are located inside the battery unit 110, part of heat generated by the battery unit 110 is prevented from being transferred to the next battery unit 110 through the cooling portions 201 (the cooling portions 201 may be made of metal and may conduct heat easily), such that occurrence of thermal runaway in the entire battery module is inhibited.

Further, as shown in FIG. 3, the battery pack includes a plurality of battery units 110, and each of the battery units 110 may be provided with the cooling portions 201. In other embodiments, in the case that the battery pack includes plural battery units 110, the cooling portions 201 may all be located in the range of one of the battery units 110 only.

Figure 11:
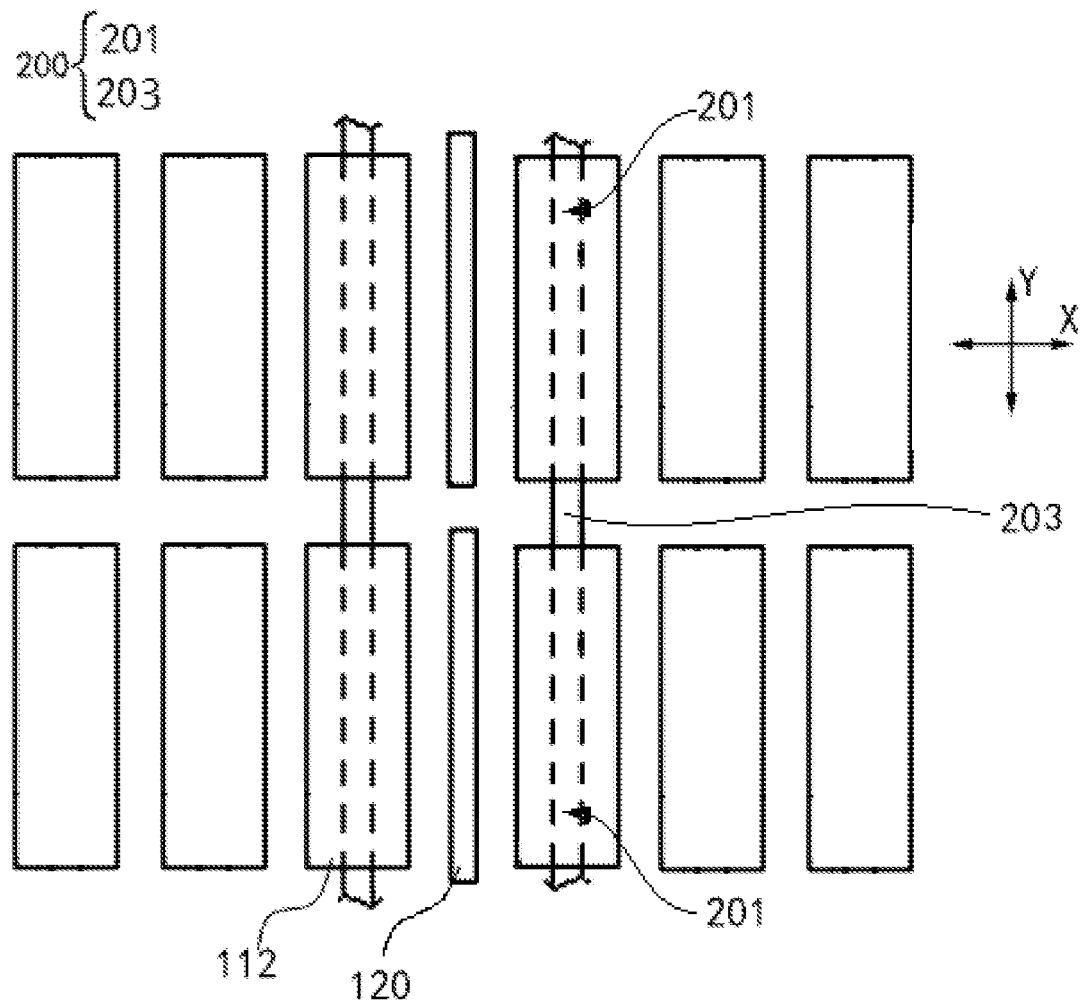
FIG. 11 is a schematic top view illustrating a partial structure of a battery pack according to another exemplary embodiment of the disclosure.

Further, as shown in FIG. 3, based on the design in which the cooling regions of the cooling portions 201 are located in the range of the battery units 110, each battery unit 110 including three batteries 111 is treated as an example for description in this embodiment. Among the batteries 111 in the same battery unit 110, the battery 111 adjacent to the heat insulation structure 120 may be defined as a target battery, and the batteries 111 which are not adjacent to the heat insulation structure 120 are defined as non-target batteries 113. Based on the above, the non-target batteries 113 at least partially overlap with the cooling regions of the cooling portions 201. The cooling regions at least partially overlapping with the non-target batteries 113 are non-target battery cooling regions, and the target batteries 112 are entirely located outside the non-target battery cooling regions. Accordingly, in the disclosure, heat is effectively inhibited from being transferred to the target batteries 112 through the cooling portions 201, such that heat transfer from the target batteries 112 to the adjacent battery units 110 is decreased, and occurrence of thermal runaway in other battery units 110 is thus effectively inhibited. In other embodiments, the target batteries 112 may be partially located outside the non-target battery cooling regions. Alternatively, as shown in FIG. 11, each of the target batteries 112 may be provided with the cooling portion 201 whose cooling region at least partially overlaps with the target batteries 112 only. When thermal runaway occurs in a battery 111 in the battery unit 110, in order to decrease heat transferred towards adjacent battery units 110, heat of the target batteries 112 is required to be lowered. As such, through such a design, other batteries 111 are prevented from performing individual heat dissipation for the target batteries 112 when conducting heat for the target batteries 112 through the cooling portions 201 at the same time, and occurrence of thermal runaway is thereby effectively inhibited.

Embodiment Three

Figure 4:
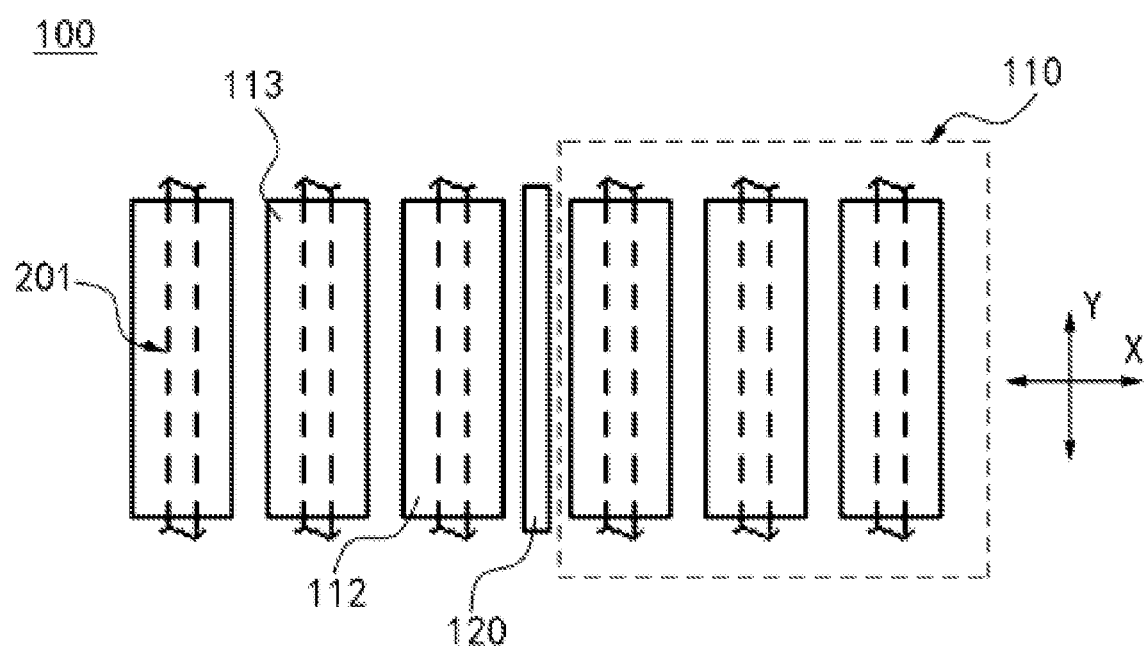
FIG. 4 is a schematic top view illustrating a partial structure of a battery pack according to another exemplary embodiment of the disclosure.

Based on the detailed description of the battery pack of embodiment two provided by the disclosure, description of the battery pack of embodiment three provided by the disclosure is stated as follows with reference to FIG. 4. With reference to FIG. 4, which is a schematic top view illustrating a partial structure of the battery pack according to embodiment three of the disclosure. The battery pack provided in embodiment three adopts a design substantially similar to that adopted in embodiment two, and a difference in battery pack design between embodiment three and embodiment two is described as follows.

Optionally, as shown in FIG. 4, in this embodiment, the orthographic projections of the plural cooling portions 201 of the liquid cooling tube 200 on the battery column 100 at least partially overlap with the plural batteries 111.

Embodiment Four

Figure 5:
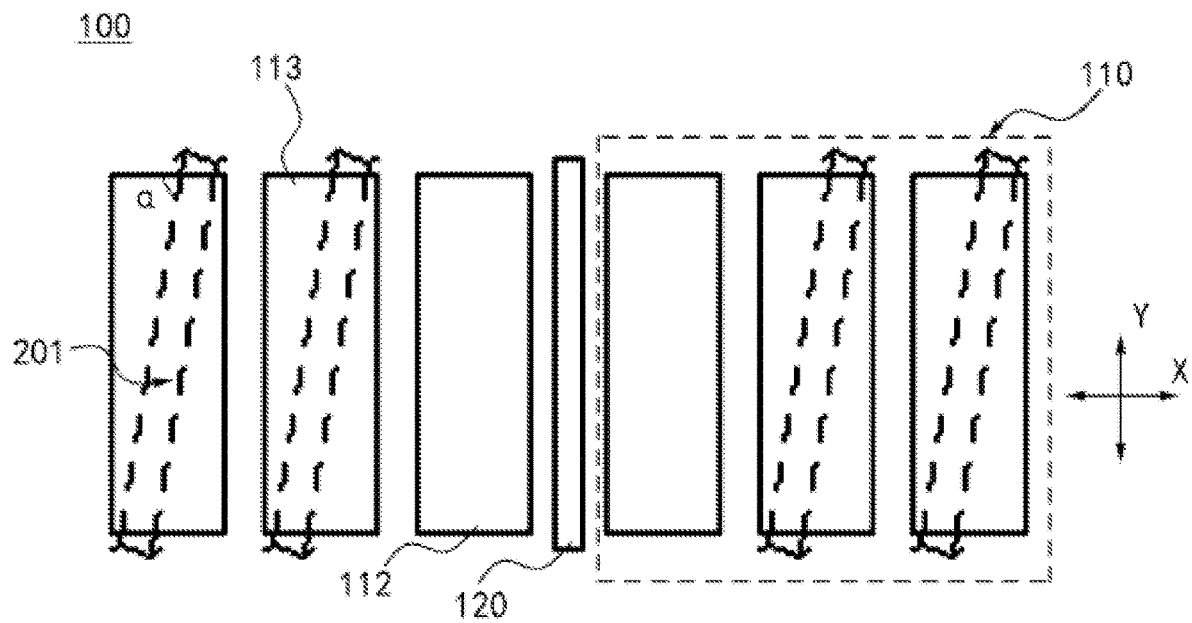
FIG. 5 is a schematic top view illustrating a partial structure of a battery pack according to another exemplary embodiment of the disclosure.

Based on the detailed description of the battery pack of embodiment two provided by the disclosure, description of the battery pack of embodiment four provided by the disclosure is stated as follows with reference to FIG. 5. With reference to FIG. 5, which is a schematic top view illustrating a partial structure of the battery pack according to embodiment four of the disclosure. The battery pack provided in embodiment four adopts a design substantially similar to that adopted in embodiment two, and a difference in battery pack design between embodiment four and embodiment two is described as follows.

As shown in FIG. 5, in this embodiment, the included angle α is defined between the extending direction of the cooling portions 201 of the liquid cooling tube 200 and the arrangement direction of the batteries 111, that is, the included angle α is defined between the first direction X and the second direction Y. The included angle α may be less than 90° but is required to be greater than 0°, such as 75°, 60°, 45°, 30°, etc. In other words, in any possible implementation compliant with the design concept of the disclosure, the included angle α may be less than or equal to 90° and greater than 0°.

Embodiment Five

Figure 6:
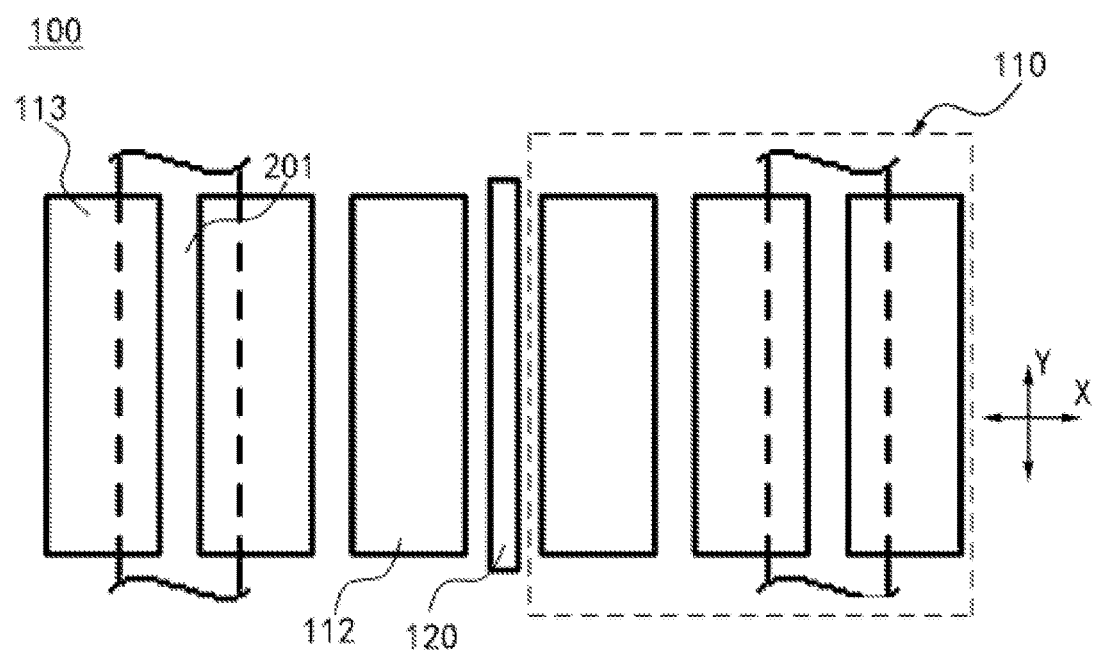
FIG. 6 is a schematic top view illustrating a partial structure of a battery pack according to another exemplary embodiment of the disclosure.

Based on the detailed description of the battery pack of embodiment two provided by the disclosure, description of the battery pack of embodiment five provided by the disclosure is stated as follows with reference to FIG. 6. With reference to FIG. 6, which is a schematic top view illustrating a partial structure of the battery pack according to embodiment five of the disclosure. The battery pack provided in embodiment five adopts a design substantially similar to that adopted in embodiment two, and a difference in battery pack design between embodiment five and embodiment two is described as follows.

As shown in FIG. 6, the difference lies in the design that the orthographic projection of one cooling portion 201 on the battery column 100 overlaps with one battery 111 in embodiment two. In this embodiment, the orthographic projection of one cooling portion 201 on the battery column 100 may overlap with two batteries 111, and both the two batteries 111 partially overlap with the cooling portion 201. In other words, in any possible implementation compliant with the design concept of the disclosure, at least partial regions of at least two batteries 111 may individually overlap with the cooling region.

Embodiment Six

Figure 7:
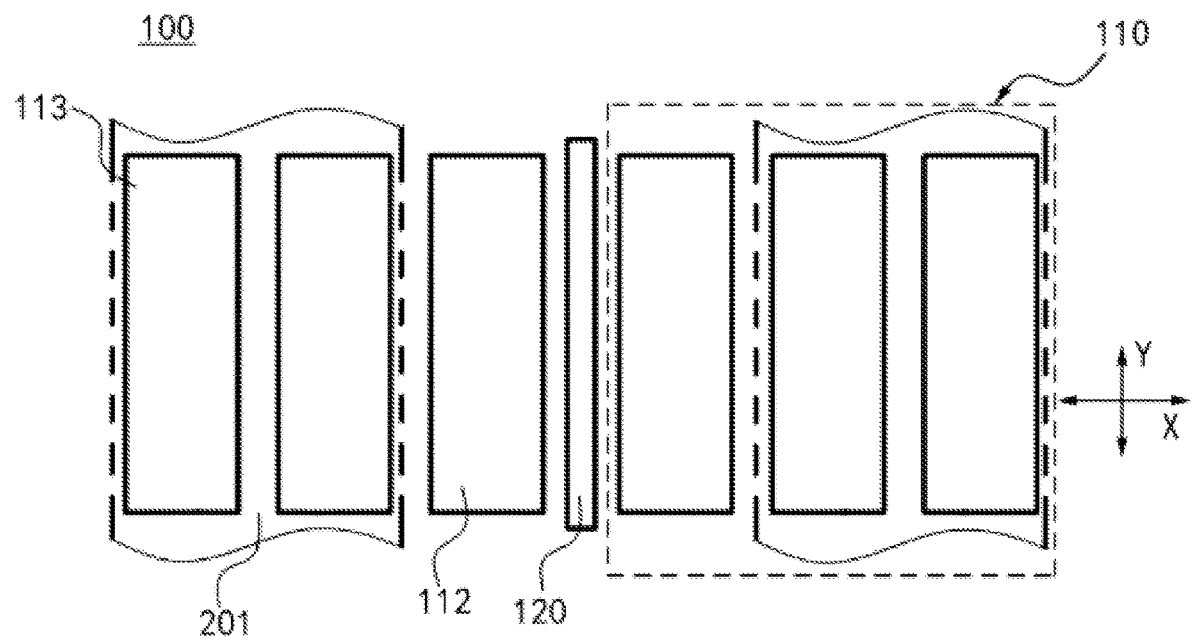
FIG. 7 is a schematic top view illustrating a partial structure of a battery pack according to another exemplary embodiment of the disclosure.

Based on the detailed description of the battery pack of embodiment five provided by the disclosure, description of the battery pack of embodiment six provided by the disclosure is stated as follows with reference to FIG. 7. With reference to FIG. 7, which is a schematic top view illustrating a partial structure of the battery pack according to embodiment six of the disclosure. The battery pack provided in embodiment six adopts a design substantially similar to that adopted in embodiment five, and a difference in battery pack design between embodiment six and embodiment five is described as follows.

As shown in FIG. 7, the difference lies in the design that the orthographic projection of one cooling portion 201 on the battery column 100 overlaps with portions of orthographic projections of two batteries 111 in embodiment five. In this embodiment, the orthographic projection of one cooling portion 201 on the battery column 100 overlaps with the entire orthographic projections of two batteries 111. In this way, heat generated by thermal runaway which occurs in at least two batteries 111 may be taken away all together, and it thus can be seen that heat dissipation efficiency is further improved, and thermal runaway is inhibited from occurring in the entire battery module.

Embodiment Seven

Figure 8:
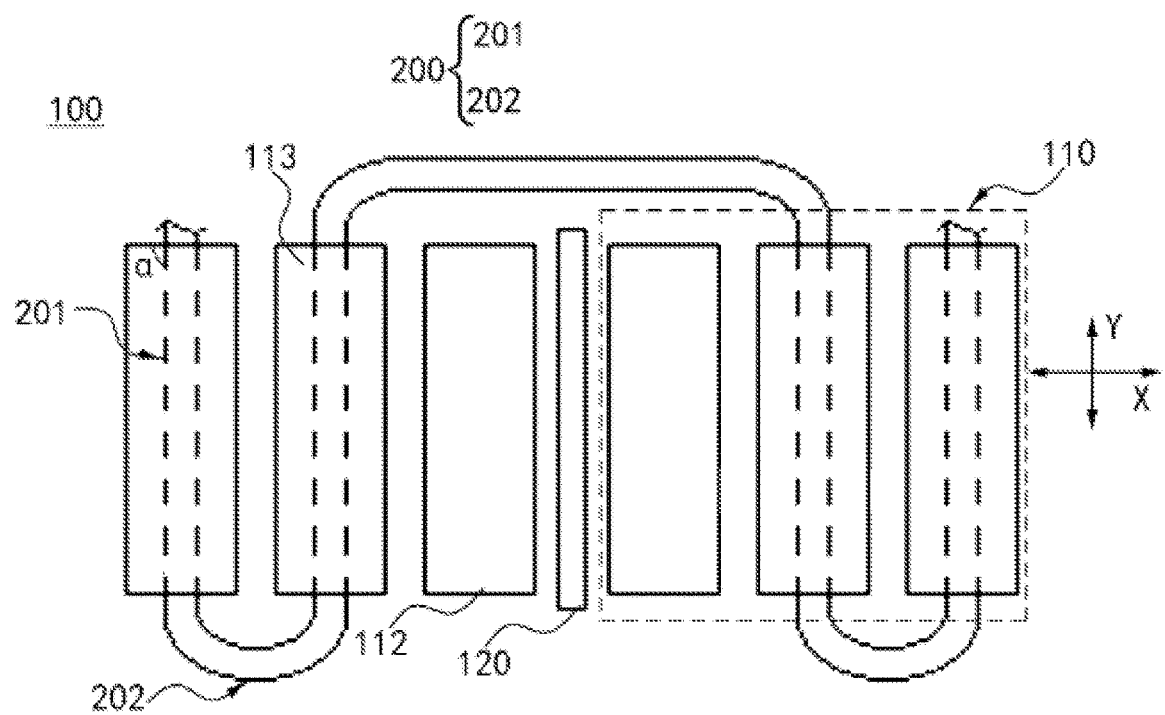
FIG. 8 is a schematic top view illustrating a partial structure of a battery pack according to another exemplary embodiment of the disclosure.

Based on the detailed description of the battery pack of embodiment two provided by the disclosure, description of the battery pack of embodiment seven provided by the disclosure is stated as follows with reference to FIG. 8. With reference to FIG. 8, which is a schematic top view illustrating a partial structure of the battery pack according to embodiment seven of the disclosure. The battery pack provided in embodiment seven adopts a design substantially similar to that adopted in embodiment two, and a difference in battery pack design between embodiment seven and embodiment two is described as follows.

As shown in FIG. 8, in this embodiment, the liquid cooling tube 200 may further include second connection portions 202, and each of the second connection portions 202 is connected between at least two cooling portions 201. Based on the above, the liquid cooling tube 200 may connect the cooling portions 201 corresponding to the non-target battery cooling regions through the second connection portions 202. The second connection portions 202 may connect the cooling portions 201 corresponding to the non-target battery cooling regions of adjacent battery units 110 together, so that one liquid cooling runner may be implemented to dissipate heat for at least two battery units 110. In addition, the second connection portions 202 may also connect the cooling portions 201 corresponding to the non-target battery cooling regions of non-adjacent battery units 110 together. The purpose is to minimize the heat generated by thermal runaway in a specific battery unit 110 from being transferred to the adjacent battery unit 110 through the first connecting portions 201, and occurrence of thermal runaway is thereby effectively inhibited.

Further, as shown in FIG. 8, the liquid cooling tube 200 is designed to be provided with the cooling portions 201 and the second connection portions 202. In this embodiment, an extending path of the liquid cooling tube 200 may substantially be serpentine, such as a structural form similar to a cooling coil or a liquid cooling row. In other embodiments, based on the second connection portions of different structural forms, the extending path of the liquid cooling tube 200 may also be shaped to be other structural forms and is not limited to the structural form provided in this embodiment.

Embodiment Eight

Figure 9:
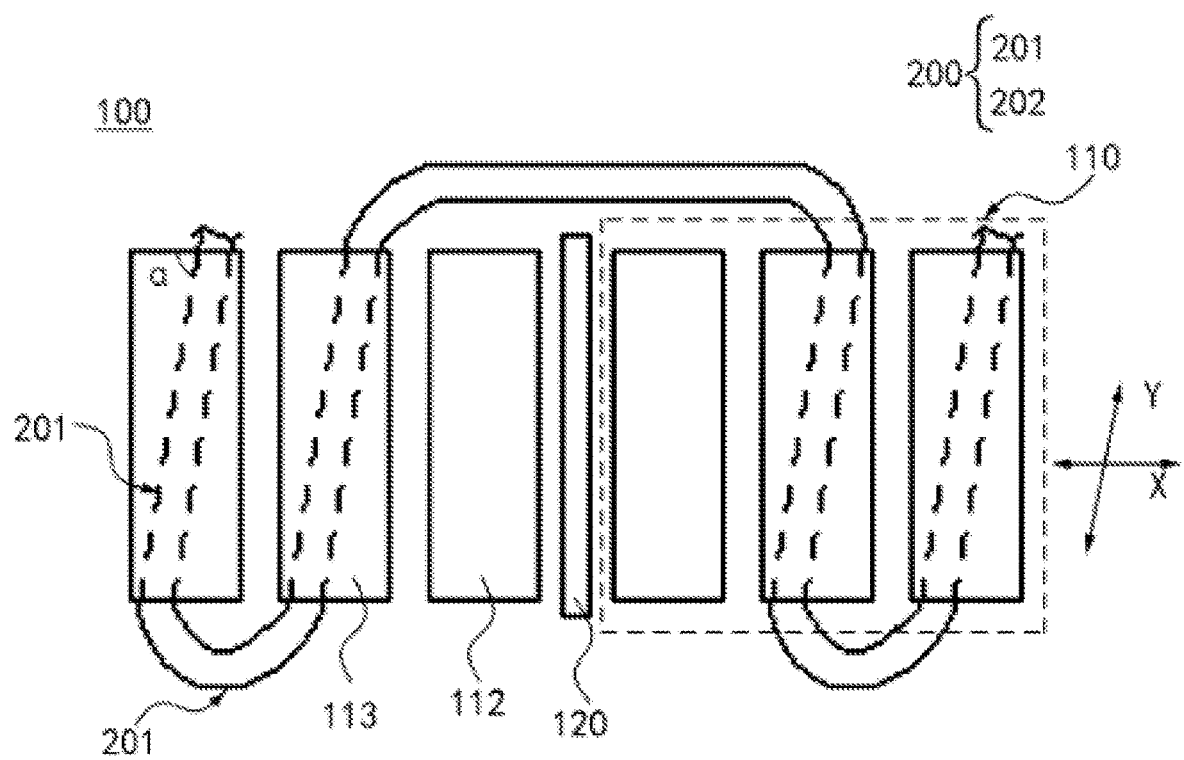
FIG. 9 is a schematic top view illustrating a partial structure of a battery pack according to another exemplary embodiment of the disclosure.

Based on the detailed description of the battery pack of embodiment seven provided by the disclosure, description of the battery pack of embodiment eight provided by the disclosure is stated as follows with reference to FIG. 9. With reference to FIG. 9, which is a schematic top view illustrating a partial structure of the battery pack according to embodiment eight of the disclosure. The battery pack provided in embodiment eight adopts a design substantially similar to that adopted in embodiment seven, and a difference in battery pack design between embodiment eight and embodiment seven is described as follows.

As shown in FIG. 9, in this embodiment, the included angle α is defined between the extending direction of the cooling portions 201 of the liquid cooling tube 200 and the arrangement direction of the batteries 111, that is, the included angle α is defined between the first direction X and the second direction Y. The included angle α may be less than 90° but is required to be greater than 0°, such as 75°, 60°, 45°, 30°, etc.

Embodiment Nine

Figure 10:
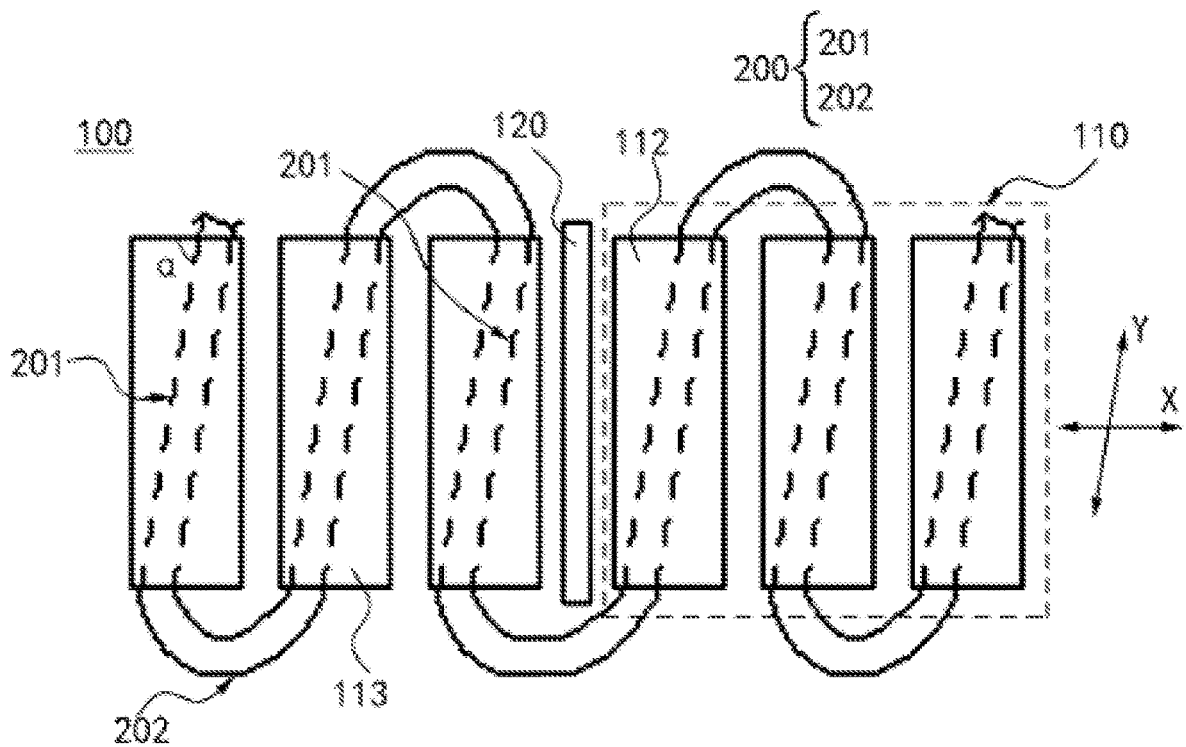
FIG. 10 is a schematic top view illustrating a partial structure of a battery pack according to another exemplary embodiment of the disclosure.

Based on the detailed description of the battery pack of embodiment eight provided by the disclosure, description of the battery pack of embodiment nine provided by the disclosure is stated as follows with reference to FIG. 10. With reference to FIG. 10, which is a schematic top view illustrating a partial structure of the battery pack according to embodiment nine of the disclosure. The battery pack provided in embodiment nine adopts a design substantially similar to that adopted in embodiment eight, and a difference in battery pack design between embodiment nine and embodiment eight is described as follows.

As shown in FIG. 10, in this embodiment, the included angle α between the extending direction of the cooling portions 201 of the liquid cooling tube 200 and the arrangement direction of the batteries 111 is less than 90°. In addition, the liquid cooling tube 200 may be disposed within a range of all batteries 111. In other words, each of the orthographic projections of the cooling portions 201 of the liquid cooling tube 200 on the battery column 100 may be located within a range of each of the orthographic projections of the batteries 111.

Embodiment Ten

As shown in FIG. 11, in this embodiment, the liquid cooling tube further includes first connection portions 203. The cooling regions only at least partially overlapping with the target batteries 112 are target battery cooling regions, and the first connection portions 203 connect the cooling portions 201 corresponding to the target battery cooling regions arranged in the second direction Y together. Through such a design, the liquid cooling tube 200 may dissipate heat for at least two target batteries at the same time by using one runner, so that utilization of the liquid cooling tube 200 is effectively improved, and costs are thereby saved.

Note that the battery pack examples shown in the drawings and described in the specification are only a few examples of many types of battery packs that may adopt the principles of the disclosure. It should be clearly understood that the principles of the disclosure are by no means limited to any details or any components of the battery pack shown in the drawings or described in the specification.

In view of the foregoing, the battery pack provided by the disclosure includes the battery column and the liquid cooling tube. The battery column includes the batteries arranged in the first direction. The liquid cooling tube includes the cooling portions, and the cooling portions are portions having orthographic projections on the battery column. The orthographic projections of the cooling portions on the battery column are the cooling regions, the cooling portions extend in the second direction, and the second direction is not parallel to the first direction. Through the foregoing design, when thermal runaway occurs in a battery of the battery pack provided by the disclosure, heat may be quickly transferred to other batteries in the same module. Compare to an existing battery pack, in the disclosure, the liquid cooling tube adopts the design in which the extending direction of the cooling portions is not parallel to the arrangement direction of the batteries, and in this way, part of heat may be easily taken away by the cooling liquid in the liquid cooling tube, heat transferred to other batteries in the same module is decreased, and occurrence of thermal runaway may be easily inhibited.

The exemplary embodiments of the battery pack provided by the disclosure are described and/or illustrated in detail above. But the embodiments of the disclosure are not limited to the specific embodiments described herein. In contrast, the components and/or steps of each embodiment may be used independently and separately from other components and/or steps described herein. Each component and/or step of one embodiment may also be used in combination with other components and/or steps of other embodiments. When introducing the elements/components/etc. described and/or illustrated herein, the terms "one", "a", and "above" are used to indicate the presence of one or more elements/components/etc. The terms "comprising", "including", and "having" are used to indicate open-ended inclusion and indicate that there may be additional elements/components/etc. in addition to the listed elements/components/etc. In addition, the terms "first", "second", etc. provided in the claims and specification are used only as marks, and are not numerical restrictions on their objects.

Although the battery pack provided by the disclosure are described according to different specific embodiments, a person having ordinary skill in the art may recognize that implementation of the disclosure may be modified within the spirit and scope of the claims.

What is claimed is:

1. A battery pack, comprising:
    a battery column, wherein the battery column comprises at least two battery units, each of which comprises batteries, a heat insulation structure is provided between adjacent battery units, and the batteries of the battery units are arranged in a first direction;
    a liquid cooling tube, disposed on a surface of the battery column, configured to dissipate heat for the batteries, wherein the liquid cooling tube comprises cooling portions, the cooling portions are portions having orthographic projections on the battery column, the orthographic projections of the cooling portions on the battery column are cooling regions, the cooling regions of the cooling portions are located within a range of their corresponding battery units and do not overlap with the heat insulation structure, the cooling portions are disposed on at least one of a top portion and a bottom portion of the battery column, the cooling portions extend in a second direction, and the second direction is not parallel to the first direction; and
    wherein in each battery unit, one of the batteries adjacent to the heat insulation structure is a target battery, another one of the batteries not adjacent to the heat insulation structure is a non-target battery, the target battery and the non-target battery do not share the same cooling portion, and at least one of the batteries is located outside a range of the cooling regions.

2. The battery pack according to claim 1, wherein the second direction is perpendicular to the first direction.

3. The battery pack according to claim 2, wherein a length of each of the cooling portions in the second direction is equal to a width of each of the batteries in the second direction.

4. The battery pack according to claim 2, wherein
    the liquid cooling tube further comprises first connection portions, the cooling regions at least partially overlapping with the target batteries of the battery units are target battery cooling regions, and the first connection portions connect the cooling portions corresponding to the target battery cooling regions arranged in the second direction together.

5. The battery pack according to claim 1, wherein at least partial regions of at least two batteries respectively overlap with the cooling regions.

6. The battery pack according to claim 1, wherein the liquid cooling tube further comprises second connection portions, and the second connection portions connect the cooling portions corresponding to the non-target batteries together.

7. The battery pack according to claim 1, wherein the target battery is provided with the cooling portion whose cooling region at least partially overlaps with the target battery.

8. The battery pack according to claim 1, wherein each of the battery units is provided with the cooling portions.

* * * * *